United States Patent [19]
Smith et al.

[11] Patent Number: 5,949,370
[45] Date of Patent: *Sep. 7, 1999

[54] POSITIONABLE SATELLITE ANTENNA WITH RECONFIGURABLE BEAM

[75] Inventors: Terry M. Smith, La Honda; James P. Marshburn, San Jose, both of Calif.

[73] Assignee: Space Systems/Loral, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/966,122

[22] Filed: Nov. 7, 1997

[51] Int. Cl.$^6$ ..................................................... H04B 7/185
[52] U.S. Cl. .......................... 342/354; 342/372; 342/359
[58] Field of Search .................................... 342/354, 359, 342/372, 373

[56] References Cited

U.S. PATENT DOCUMENTS

| | | | |
|---|---|---|---|
| 3,898,667 | 8/1975 | Raab | 343/756 |
| 4,647,938 | 3/1987 | Roederer et al. | 343/756 |
| 5,581,265 | 12/1996 | Stirland et al. | 343/756 |
| 5,587,714 | 12/1996 | Chu et al. | 342/354 |
| 5,734,349 | 3/1998 | Lenormand et al. | 342/373 |
| 5,736,963 | 4/1998 | Roederer et al. | 342/373 |

*Primary Examiner*—Theodore M. Blum
*Attorney, Agent, or Firm*—Perman & Green, LLP

[57] ABSTRACT

An antenna, forming a part of an antenna system, is suitable for use on a communication satellite encircling the earth, and has a reflector illuminated by a set of feed elements wherein one of the feed elements generates a primary beam. The reflector is shaped to establish a specific configuration of the beam, and, upon illumination of the earth, there results a specific shape to the beam footprint. A mechanical positioning device connects the antenna with a body of the spacecraft for adjusting an orientation of the feed antenna and its beam relative to the body of the spacecraft. Control circuitry for adjustment of signal strengths and phase shifts of signals sent to respective ones of the feeds is accomplished by electronic circuitry including a memory which stores coefficients employed in the operation of variable power dividers and variable phase shifters of a feed network supplying electromagnetic signals to the feed. The memory is addressed to provide a desired correction to beam configuration corresponding to a specific orientation of the antenna.

11 Claims, 2 Drawing Sheets

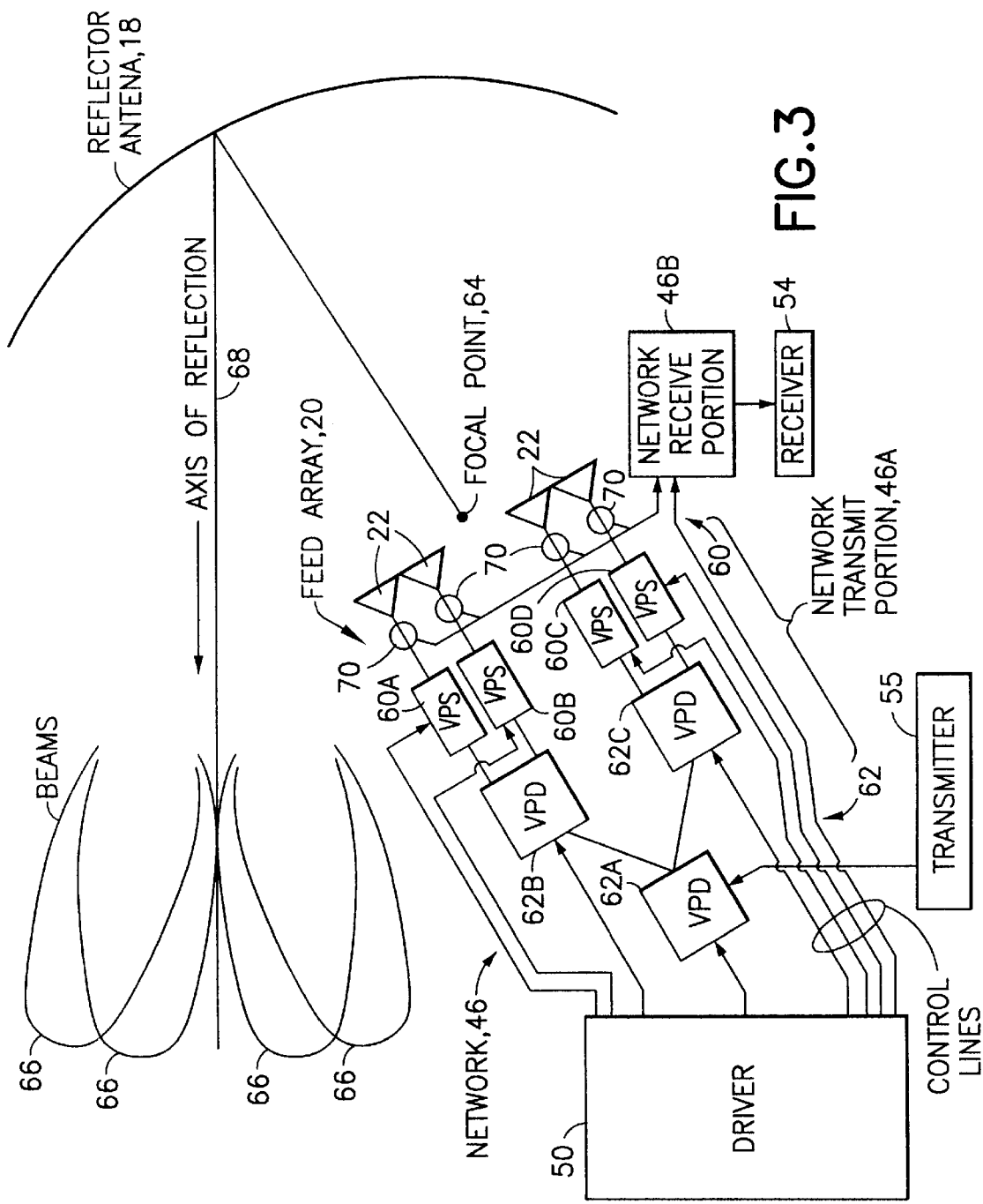

POSITIONABLE SATELLITE ANTENNA WITH RECONFIGURABLE BEAM

BACKGROUND OF THE INVENTION

This invention relates to mechanically steerable antennas, suitable for use on board a communications satellite encircling the earth and, more particularly, to an antenna having an array of feed elements illuminating a reflector wherein the reflector is a shaped-beam reflector and wherein, upon a repositioning of the antenna relative to the satellite, there is an adjustment of the beam configuration by use of a feed network comprising variable power dividers and variable phase shifters.

In the use of communication satellites, one or more antennas on board the satellite direct beams of radiation to selected locations on the earth's surface as the satellite progresses in a stationary orbit about the earth. Based on considerations of communication traffic, it may be desirable to reorient an antenna relative to the body of the satellite so as to illuminate another portion of the earth's surface. Each portion of the earth's surface to be illuminated is characterized by a desired beam footprint designating the specific area of the earth's surface wherein are located receiving and/or transmitting stations which are to communicate with the satellite via the antenna. The antenna includes both a reflector and an array of feeds which illuminate the reflector to produce a beam configuration and corresponding footprint. However, with a repositioning of the antenna to illuminate different regions of the earth, it is desirable frequently to adjust the configuration of the footprint to meet local traffic conditions.

By way of example, two antennas on board a single satellite may be directed to illuminate various areas of the earth's surface in footprints configured to overlap edge regions of neighboring footprints. Or, antennas carried by different satellites may cooperate by illuminating various areas of the earth's surface wherein footprints from the beams of the various antennas are to overlap slightly at the peripheral regions of the respective beam footprints. The configurations of the various footprints may vary, depending on the viewing angles by which the satellite directs the beam to the earth. The footprints may vary such that a relatively small populated region of the earth may be assigned to one beam. A much larger region of the earth of relatively sparse population may employ a single antenna covering the larger region. Therefore, upon a repositioning of a beam, it may be necessary to provide for adjustment of the beam configuration.

It is desirable to be able to adjust the footprint in a generally continuous fashion so as to allow for various configurations of footprints which may become desirable as a result of shifting patterns of population on the earth and shifting demands for the satellite service. Prior communication antennas have been inadequate in this respect in that their capacity for alteration of footprint configuration was limited to a relatively small number of footprints obtainable by switching various feeds of a feed network.

A problem exists in that presently available communication antennas while being mechanically steerable do not provide a desired capacity for precise adjustment of footprint configuration.

SUMMARY OF THE INVENTION

The aforementioned problem is overcome and other advantages are provided by an antenna system suitable for being carried by a satellite. In accordance with the invention, the system includes an antenna which comprises a reflector illuminated by an array of feed elements, the array being much smaller than a diameter of the reflector. Typically, the reflector has the general shape of a section of an ellipsoid or parabola, by way of example, and the reflector is further shaped to provide for a specific configuration of beam. Upon deployment of a satellite encircling the earth, the beam configuration produces a footprint on the surface of the earth.

An antenna positioning mechanism is provided for moving the antenna relative to a body of the spacecraft. A repositioning of the beam results in illumination of a different portion of the earth's surface with a possible consequential need for an adjustment of the configuration of the beam footprint upon the earth's surface. The invention provides for adjustment of the configuration of the beam configuration by adjustment of relative signal strengths and phase shifts among signals of elements of the feed. Due to the relatively small size of the array of feed elements, relative to the diameter of the reflector, the primary contribution to the configuration of the beam is the geometry of the reflector. An offsetting in the position of one feed element relative to another feed element results in an inclination of their respective beams relative to each other. Summation of the electric and magnetic fields of the respective beams produces a resultant beam having a footprint different from the footprint of any one of the beams. Adjustment of the relative phases and amplitudes of the signals of the respective feed elements results in an adjustment of the configuration of the resultant beam to suit a specific situation to be handled by the communication satellite.

Beam control circuitry for adjustment of the beam configuration comprises a set of adjustable power dividers and adjustable phase shifters connected in a network for applying the desired signals to respective ones of the elements of the feed. Adjustment occurs by multiple steps to approximate a continuously variable (analog) form of adjustment. Operation of the power dividers and of the phase shifters is controlled electronically by means of digital coefficients stored in a memory wherein specific sets of coefficients have been previously established for development of a specific beam footprint. New footprint configurations can be developed by sensing beam intensity at various locations on the earth's surface and calculating, via simulation on a computer, the necessary coefficients for the new footprint. These coefficients can then be transmitted to the satellite for storage in the memory.

BRIEF DESCRIPTION OF THE DRAWINGS

The aforementioned aspects and other features of the invention are explained in the following description, taken in connection with the accompanying drawing figures wherein:

FIG. 3 shows circuitry for driving the elements of the antenna.

Identically labeled elements appearing in different ones of the figures refer to the same element but may not be referenced in the description for all figures.

DETAILED DESCRIPTION

Figure 1:
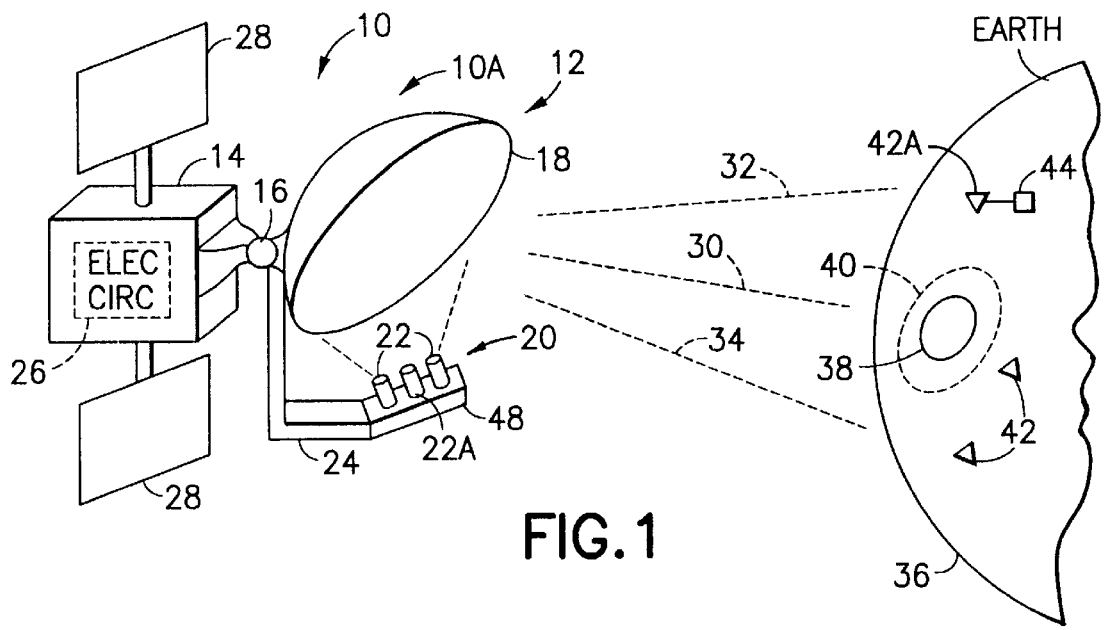
FIG. 1 is a stylized view of a satellite encircling the earth and carrying an antenna constructed in accordance with the invention.

FIG. 1 shows a satellite 10 carrying an antenna system 10A which includes an antenna 12 affixed to a body 14 of the satellite 10 by a positioning mechanism 16. The positioning mechanism 16 serves to pivot the antenna 12 relative to the body 14 to provide for an orientation of the antenna 12 in a desired direction relative to the satellite 10. The antenna 12 comprises a reflector 18 and an array 20 of feed elements 22 which illuminate a front concave side of the reflector 18. A frame 24 extends from a base portion of the reflector 18 for supporting the feed elements 22 at a location at or near a focus of the reflector 18 and offset from an axis of a main beam of the reflector 18. The satellite 10 is constructed in conventional fashion, and includes electronic circuitry 26 powered with electric power provided by solar panels 28 carried by the satellite 10. The electronic circuitry 26 serves to generate electromagnetic signals radiated as a beam 30 from the antenna 12, and to control a cross-sectional shape of the beam 30. Alternative positions of the beam 30 are indicated at 32 and 34, which alternative positions result from a pivoting of the antenna 12 by the positioning mechanism 16.

The satellite 10 travels in an orbit about the earth 36 with the antenna 12 facing the earth for illumination of a portion of the earth's surface by the beam 30. In the event that the antenna 12 has been pivoted, illumination of another portion of the earth's surface is accomplished via the beam 32 or the beam 34, by way of example. In the illumination of a portion of the earth's surface by the beam 30, an actual footprint 38 of an illumination pattern is shown in solid line while a desired configuration of the footprint is indicated by a dashed line at 40. Various ground stations 42 are shown at different locations on the earth's surface for receiving radiated signals (down-link) transmitted from the satellite 10, and for transmitting signals (up-link) to the satellite 10. One of the ground stations 42, namely station 42A may be provided with a computer 44 for calculation of a desired set of coefficients for control of beam cross section, in accordance with the invention, as will be described hereinafter.

Figure 2:
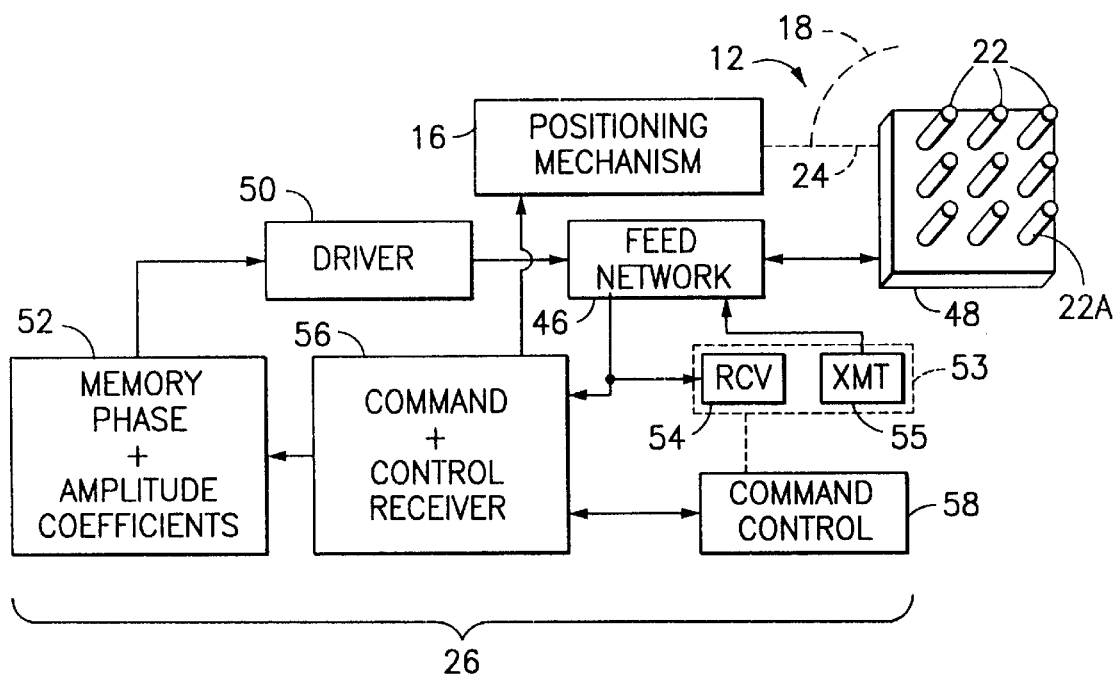
FIG. 2 is a block diagram showing components of the antenna and control circuitry for operation of the antenna.

With reference to FIG. 2, the electronics unit 26 comprises a feed network 46 connecting with an assembly 48 of the feed elements 22 for imparting phase and amplitude to each of the respective signals that are applied to various ones of the feed elements 22. A driver 50 is responsive to coefficients of phase and amplitude stored within a memory 52 for driving variable power dividers and variable phase shifters of the feed network 46 (as will be described in FIG. 3) to impart the desired relative amplitudes and relative phases among the signals of the various feed elements 22. Also included within the electronics circuitry 26 are a transmit/receive unit 53 which includes a receiver 54 of up-link signals and a transmitter 55 of down-link signals, a command and control receiver 56, and a communications control unit 58. The receivers 54 and 56 and the transmitter 55 connect with the feed assembly 48 via the feed network 46. The control unit 58 connects with the command and control receiver 56 and the transmit/receive unit 53.

In the operation of the satellite 10 to provide the communications function, the feed network 46 is operative to pass both up-link signals from the feed assembly 48 to the transceiver 54 and down-link signals from the transceiver 54 to the feed assembly 48. The feed network 46 imparts various phases and amplitudes to signals of respective ones of the feed elements 22, in a manner to be described with reference to FIG. 3, to provide a desired cross-sectional configuration to a beam, such as the beam 30 (FIG. 1) produced by the antenna 12. The transmit/receive unit 53 is operative in response to signals of the communications control unit 58 for receiving up-link signals in various up-link channels and for retransmitting the signals as down-link signals in various down-link channels. Included within an up-link signal transmitted from the ground station 42A (FIG. 1) are command and control signals to the receiver 56 for operation of the positioning mechanism 16 to direct a specific orientation of the antenna 12, for selecting coefficients of the memory 52 to configure a beam such as the beam 30, and for instructing the communications control unit 58 in the handling of communications traffic.

FIG. 3 shows details in the construction of the antenna 12 including also details in the construction of the feed network 46 connecting with the feed elements 22 of the antenna 12, four of the feed elements 22 being shown by way of example. The feed network 46 comprises a transmit portion 46A and a receive portion 46B. The network transmit portion 46A comprises a plurality of variable phase shifters (VPS) 60 of which individual ones are further identified as 60A, 60B, 60C and 60D, and a plurality of variable power dividers (VPD) 62 of which individual ones thereof are further identified as 62A, 62B and 62C. The array 20 of the feed elements 22 is positioned, preferably, at a focal point 64 of the reflector 18. Unlike a phased-array antenna wherein the radiations of numerous individual feed elements are summed together with specified phase and amplitude tapers to produce a beam in a desired direction, the reflector 18 serves the function of gathering and collimating the rays of radiation emitted by respective ones of the feed elements 22 to produce desired beams of radiation. Each of the respective feed elements 22 also acts with the reflector 18 to produce a beam of radiation, four such beams being shown, by way of example, as beams 66 disposed symmetrically about an axis 68 of an array of the beams.

The network receive portion 46B is constructed in a fashion analogous to the construction of the network transmit portion 46A, and may include phase shifters (not shown) for setting relative phases among received signals of the feed elements 22, and power combiners (not shown) for combining received signals of the various feed elements 22 to form the received beam. In order to separate a transmitted signal from a received signal for each of the respective feed elements 22, signal separators 70 interconnect respective ones of the feed elements 22 with both the transmit portion 46A and the receive portion 46B of the network 46. By way of example, a signal separator 70 may be an orthogonal mode junction (OMJ) for the case of orthogonally polarized transmit and received signals, or a diplexer in the case of copolarized signals.

The electric and the magnetic fields of respective ones of the beams 66 sum together in the far field of the reflector 18 to produce a beam, such as the beam 30 in FIG. 1, having a desired cross-sectional configuration. For forming the beam 30, the radiating aperture of the reflector 18 is greater than the radiating aperture of the feed array 20, at least by a factor of approximately ten for improved directivity of the beam 30, a factor in the range of 50–100 being used in a preferred embodiment of the invention. Adjustment of relative phases and amplitude of the signals emitted by each of the feed elements 22, with respect to each other effects the summation of the electric and magnetic fields of the beams 66 for control of the cross-sectional configuration of the resulting beam 30.

The operation of the feed network 46 may be described with respect to the transmission of a down-link signal via the network transmit portion 46A. In the transmission of a down-link signal, the transmitter 55 outputs the down-link signal to the power divider 62A which operates to divide the power of the signal between the power dividers 62B and 62C. The power divider 62B provides for a further division of the signal power among two signal channels, and the power divider 62C operates similarly to divide its signal power among two further signal channels. Each of the signal channels comprises a phase shifter 60 and a feed element 22. Power for the first signal channel is provided by the power divider 62B in concert with the phase shifter 60A, power for the second signal channel is provided by the power divider 62B in concert with the phase shifter 60B, power for the third signal channel is provided by the power divider 62C in concert with the phase shifter 60C, and power for the fourth signal channel is provided by the power divider 62C in concert with the phase shifter 60D.

Control signal lines are provided for respective ones of the power dividers 62 and the phase shifters 60 of the network transmit portion 46A, and also for the variable phase shifters and the variable power combiners (not shown) of the network receive portion 46B. The control signal lines connect with the driver 50 to enable the driver 50 to communicate, in the case of transmitted signals, with the respective power dividers 62 and phase shifters 60 for commanding the respective power dividers 62 and phase shifters 60 to provide, respectively, desired power divisions among the signal channels. Corresponding operation of the driver applies for control of the components of the network receive portion 46B for the case of received signals.

With respect to the operation of the antenna system 10 (FIGS. 1–3), the command and control receiver 56 supplies the phase and amplitude coefficients to the memory 52 in accordance with instructions received from the ground station 42A. The memory 52 is also provided with coefficients of phase and amplitude prior to a launching of the satellite 10, which coefficients serve to define a beam configuration in the absence of specific requests by the ground station 42A. This allows ground control to establish the setting of any of the variable components of the network 46 to obtain any of numerous beam shapes. Thus, the memory 52, in conjunction with the driver 50 and the feed network 46, serves as a beam controller for controlling the configuration of the beam 30 radiated by the antenna 12. The command and control receiver 56 outputs two forms of signals, one form of signal being the coefficients to be stored in memory 52, and the other form of signal being an address for addressing the memory 52 to output a specific set of the coefficients to the driver 50 for accomplishing the desired beam configuration.

The command and control receiver 56 also serves as a director of antenna orientation by commanding the positioning mechanism 16 to orient the antenna 12 with a desired orientation relative to the body 14 of the satellite 10. For any position of the antenna 12, the shaped reflector 18 focuses radiation from respective ones of the feeds 22 to produce beams which sum together to give a scanned beam 72 of desired cross-sectional configuration. The specific locations of the feeds 22 is a matter of choice in the design of the antenna 12 for performance of a specific mission but, in a typical situation, the feeds 22 would be spaced apart by one to two wavelengths of the radiation emitted by the antenna 12, and the radiating aperture of an individual feed element would be approximately one wavelength in diameter.

The number of the feeds 22 is also determined by the mission of the satellite and the amount of control desired over peripheral regions of the beam footprint on the earth's surface. Thus, for very fine adjustment of the footprint, by way of example, a larger number of the feeds 22 would be employed. The feeds 22 may be distributed uniformly about the focal point 64 or, if adjustments are to be made primarily in an east-west direction of the footprint, by way of example, more of the feeds 22 may be disposed horizontally than vertically in the assembly 48 (FIG. 2). Continuous adjustment of the phase shifters 60 may be attained by either analog or digital circuitry, as is well known in the construction of phase shifters. Similarly, control of power division of the power dividers 62 for continuous adjustment of power ratios may be attained either by analog or digital circuitry, such circuitry being well known for adjustment of power ratios. Thereby, the invention is able to redirect a beam of radiation while controlling the configuration of the beam cross section.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. An antenna system suitable for being carried on board a satellite traveling about the earth, the antenna system including an antenna comprising a reflector and an array of feed elements which illuminate the reflector to produce a beam of radiation emitted by the antenna, the system comprising:

positioning means operative to orient the antenna relative to a body of the satellite for illuminating a desired position of the earth with the beam;

a beam controller having a feed network for applying signals to respective ones of the feed elements;

wherein the reflector is a shaped reflector operative with the feed elements to produce a beam footprint, and the beam controller is operative to adjust the configuration of the beam to reconfigure the beam footprint to provide a desired footprint on the surface of the earth;

the beam controller adjusts relative amplitudes and phases out the signals fed to respective ones of the feed elements, the antenna system including a plurality of power dividers operative to vary a ratio of division of power among respective ones of the feed elements to accomplish adjustment of relative amplitudes of signals radiated by the respective feed elements; and wherein the beam controller is operative in conjunction with said positioning means to establish a desired configuration of footprint in correspondence with a repositioning of the antenna.

2. An antenna system according to claim 1 wherein the reflector has a radiating aperture and the array of feed elements has a radiating aperture, the radiating aperture of the reflector being greater than the radiating aperture of the feed array by at least approximately a factor of 10.

3. An antenna system according to claim 2 wherein individual feed elements of said feed array serve for adjustment of a configuration of a cross section of the beam.

4. An antenna system according to claim 1 wherein power fed to any one of said feed elements is adjustable relative to power fed to another of said feed elements to establish a configuration of a cross section of the beam.

5. An antenna system according to claim 1 wherein said plurality of power dividers constitute a power divider network having a plurality of variable power dividers distributing power among respective ones of said feed elements for adjusting signal strength among respective ones of said feed elements, and a plurality of phase shifters connected to respective ones of said feed elements for adjusting phases of signals of the respective feed elements.

6. An antenna system according to claim 5 further comprising a memory storing coefficients for directing division of power among the variable power dividers, and for directing phase shifts imparted to signals of the respective feeds by respective ones of said phase shifters.

7. An antenna system according to claim 1 wherein power fed to any one of said feed elements is adjustable relative to power fed to another of said feed elements to establish a configuration of a cross section of the beam; and wherein said feed network of said beam controller comprises a power divider network having a plurality of variable power dividers distributing power among respective ones of said feed elements for adjusting signal strength among respective ones of said feed elements, and a plurality of phase shifters connected to respective ones of said feed elements for adjusting phases of signals of the respective feed elements.

8. An antenna system according to claim 7 further comprising a memory storing coefficients for directing division of power among the variable power dividers, and for directing phase shifts imparted to signals of the respective feeds by respective ones of said phase shifters.

9. An antenna system according to claim 1 wherein said beam is a sole beam having a fixed orientation relative to said reflector, a cross-sectional configuration of the beam being variable in accordance with variations in the amplitudes and phases of the signals fed to the respective ones of said feed elements.

10. A method for illuminating a portion of the earth's surface by an antenna system carried on board a satellite traveling about the earth, wherein the antenna system includes an antenna comprising a reflector and an array of feed elements which illuminate the reflector to produce a beam of radiation emitted by the antenna, the method comprising steps of:

placing the array at substantially a focal point of the reflector;

shaping the reflector to provide for a shaped beam, the reflector having a cross-sectional dimension many times larger than a diameter of the array for forming the shaped beam;

adjusting the phases and adjusting the amplitudes of signals radiated by respective ones of the feed elements to develop a specific configuration of footprint for a specific region of the earth's surface illuminated by the antenna, wherein said step of adjusting the amplitudes is accomplished by operating a plurality of power dividers by varying a ratio of division of power among respective ones of the feed elements;

storing sets of amplitude and phased control commands for providing various configurations of footprint to be employed in said adjusting step;

mechanically repositioning the antenna to illuminate successive regions of the earth's surface; and readjusting the phases and the amplitudes of the signals radiated by the feed elements to establish a specific configuration of footprint during a repositioning of the antenna.

11. A method for illuminating a portion of the earth's surface by an antenna system carried on board a satellite traveling about the earth, wherein the antenna system includes an antenna comprising a reflector and an array of feed elements which illuminate the reflector to produce a beam of radiation emitted by the antenna, and wherein the footprint of illumination in each of different regions of the earth's surface varies in accordance with a geometry of position of the antenna relative to each of the regions, the method comprising steps of:

placing the array at substantially a focal point of the reflector;

shaping the reflector to provide for a shaped beam, the reflector having a radiating aperture many times larger than a radiating aperture of the array for forming the shaped beam;

adjusting the phases and the amplitudes of signals radiated by respective ones of the feed elements to develop a specific configuration of footprint for a specific region of the earth's surface illuminated by the antenna, wherein said step of adjusting the amplitudes is accomplished by operating a plurality of power dividers by varying a ratio of division of power among respective ones of the feed elements;

storing sets of amplitude and phased control commands for providing various configurations of footprint to be employed in said adjusting step;

mechanically repositioning the antenna to illuminate a desired region of the earth's surface; and readjusting the phases and the amplitudes of the signals radiated by the feed elements to compensate for changes in configuration of footprint resulting from changes in the geometry of the antenna relative to a region illumination.

* * * * *